D. P. Bird,
Flood Fence.
No. 85,271. Patented Dec. 29, 1868.
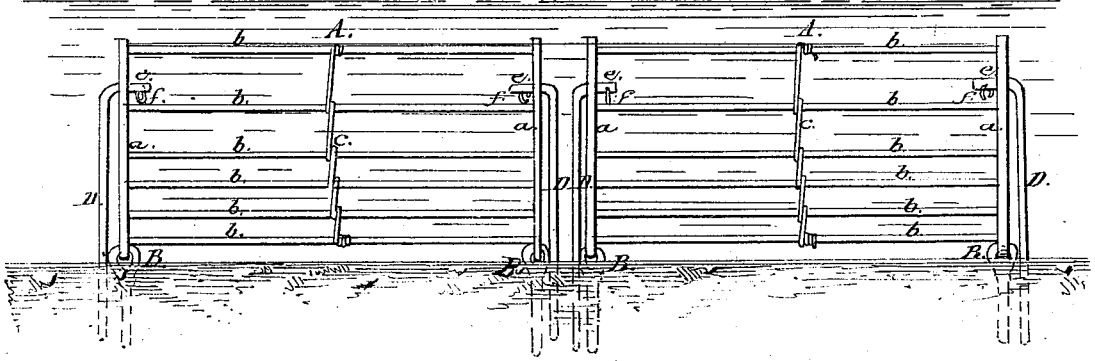
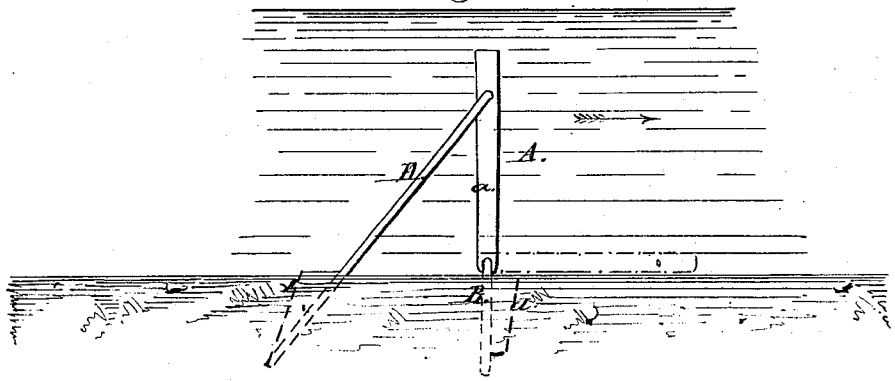
Witnesses:
Jacob T. Henry
Phil. F. Larner
Inventor:
David P. Bird
by Biedersheim & Co.
atty.

UNITED STATES PATENT OFFICE.

DAVID P. BIRD, OF RICHWOOD, OHIO.

*Letters Patent No. 85,271, dated December 29, 1868.*

IMPROVEMENT IN FLOOD-FENCE.

The Schedule referred to in these Letters Patent and making part of the same.

*To all whom it may concern:*

Be it known that I, DAVID P. BIRD, of Richwood, in the county of Union, and State of Ohio, have invented a new and useful Improved Fence; and I do hereby declare the following to be a full, clear, and exact description thereof, sufficient to enable those skilled in the art to which my invention appertains, to make and use the same, reference being had to the accompanying drawings, forming part of this specification, and in which—

Figure 1 is a front or side view of the fence in position, and

Figure 2, an end view of the same.

My improvements relate to that class of fences used for crossing running streams of water, and known as flood-fences.

Common fences used in running water are extremely liable to injury and destruction when the stream is swollen, on account, especially, of the drift-wood, which descends, in many cases, very rapidly, and with an irresistible force.

To avoid this destruction, fences have been devised, so constructed and arranged as to be thrown down when struck by drift-wood, and capable of being again set up when the water has fallen. Such fences have, however, heretofore proved unsatisfactory, because the cost and labor attending their construction and adjustment were considerable, but especially for the reason that after being set up at much cost and labor, they have frequently failed to operate effectually.

The object of my invention is to provide a light and simple panel-fence, which shall not fail to operate as desired, and which shall, at the same time, be capable of ready readjustment.

My invention consists in the construction and arrangement of parts as hereinafter set forth.

In order to convey a full understanding of my invention, I will now proceed to describe the same in detail, referring to the accompanying drawings, in the several figures of which similar letters indicate like parts.

A represents the panels of my fence, each constructed of end-uprights or posts, *a*, of metal, and horizontal wires *b b*. These wires are attached, at each extremity, to the posts, in any suitable manner.

It will be seen that the panels A are entirely disconnected, one from the other, and separately hinged and braced. The object of this arrangement is to avoid the necessity of the entire fence being thrown down when struck only at one point by drift-wood.

*c* is a central strengthening-wire, connecting all the wires *b b* together, and serving to prevent the same from being sprung apart, and thereby injured, by floating drift, or by animals seeking to pass that way. The wire *c* is twisted several times around the upper and lower wires *b* of the panel, whilst it is twisted but once at each intermediate wire.

B represents hooks inserted through holes made in the lower portion of each post *a*. After the hooks have been thus inserted they may be made to form eyes, as shown.

These hooks are formed with shanks, adapted to be fixed in the bottom of the stream, in a manner to be now described.

By means of a pointed iron bar, or other suitable implement, a hole is made in the ground, of proper size to receive the shank of the hook. The latter is then inserted in the hole, and a wooden wedge, *d*, driven in at the back of the hook, on the down-stream side, so as to force the shank of the hook firmly into the solid ground.

The hooks may be made of any length desired, according as the soil is sandy, stony, or composed chiefly of clay, in order to secure the stability of the fence.

To sustain the panels in an upright position, braces D are employed. The lower ends of these braces are secured in an inclined direction, in the bottom of the stream, in the same manner and by similar means as the hooks B. Each brace is bent at its upper end, as shown in fig. 1, and the bent portion, *e*, is inserted through a hole made near the top of each post *a*.

To prevent the brace being drawn out from the post accidentally, an opening, *f*, is fitted in a hole made through the bent portion *e*, between the end of the latter and the post through which it passes.

It will be noticed that the braces are all situated on the up-stream side of the fence, the arrow in fig. 2 pointing down stream.

In setting up the fence, the braces are to be drawn out by hand, and tried in the soil, until the desired depth is obtained, according to the nature of the soil, and the force which it is desired the fence shall withstand before giving way. The deeper the braces are set, the greater will be the pressure requisite to draw them out and throw down the fence.

When, in case of a freshet, the water in the stream rises to an unusual height, drift-wood will be borne down with rapidity and force dependent upon the height of the water, the flow of the current, and the weight and size of the floating body. The drift-wood is arrested in its downward course by the fence, against the upper part of which it strikes, until, sooner or later, according to the pressure of the drift and the fixture of the braces, the latter are drawn out from the ground, and the fence, or that panel which was struck, falls back, down stream, flat on the bottom of the latter, and the drift passes over, unimpeded in its course.

This latter position of the fence is shown in red lines in fig. 2.

When the water in the stream has sufficiently fallen, the fence, or that portion of the same which may have been prostrated, is restored to its upright position, and there retained, by fastening the braces, as before.

By my invention I am enabled to produce, at small comparative cost, a neat and light, yet substantial fence, possessing, among its many advantages, those of almost certain operation, simple construction, facile erection, and ready repair.

It frequently occurs that a stream lies between two farms, and each owner is entitled to occupy to the centre of the stream. Now, he may, by fencing towards the centre of the stream, and then forming an acute angle, return to the same side of the stream, and thus make a watering-place for stock.

I am aware of the patent granted to J. B. Johnson, dated December 17, 1867, but as this forms no part of my invention, I do not wish to claim it; but What I do claim as new, and of my invention, is—

The eye-bolts B, to which the posts $a$ of the panels are hinged, in combination with the braces D and their wedges, substantially as and for the purpose described.

To the above, I have signed my name, this 14th day of August, 1868.

DAVID P. BIRD.

Witnesses:
W. H. FERGUSON,
A. J. BLAKE.